Jan. 25, 1966  D. E. WIEGAND  3,231,094
FILTER ELEMENT, UNIT, CARTRIDGE AND INSERT
Filed April 10, 1962  5 Sheets-Sheet 1

Inventor
Donald E. Wiegand by W. Bartlett Jones,
Attorney

Jan. 25, 1966  D. E. WIEGAND  3,231,094
FILTER ELEMENT, UNIT, CARTRIDGE AND INSERT
Filed April 10, 1962  5 Sheets-Sheet 2

Inventor
Donald E. Wiegand
by W. Bartlett Jones,
Attorney

Jan. 25, 1966   D. E. WIEGAND   3,231,094
FILTER ELEMENT, UNIT, CARTRIDGE AND INSERT
Filed April 10, 1962   5 Sheets-Sheet 3

Inventor
Donald E. Wiegand
by W. Bartlett Jones
Attorney

Jan. 25, 1966  D. E. WIEGAND  3,231,094
FILTER ELEMENT, UNIT, CARTRIDGE AND INSERT
Filed April 10, 1962  5 Sheets-Sheet 5

Inventor
Donald E. Wiegand
by W. Bartlett Jones,
Attorney

United States Patent Office 3,231,094
Patented Jan. 25, 1966

3,231,094
FILTER ELEMENT, UNIT, CARTRIDGE AND INSERT
Donald E. Wiegand, Minneapolis, Minn., assignor to Wood Conversion Company, St. Paul, Minn., a corporation of Delaware
Filed Apr. 10, 1962, Ser. No. 186,466
3 Claims. (Cl. 210—487)

The present invention relates to filters for liquids, and in particular, to a disposable filter cartridge for use in self-service-pay-as-you-use dry cleaning apparatus.

In such units, the cleaning fluid, commonly perchlorethylene, is reused numerous times, and before reuse, is passed through a mechanical filter which removes the dirt and debris accumulated in use. In commercial establishments having such apparatus available for use by the public, economies are important items. One development for economy is the provision of a disposable filter cartridge having long life in use, which is low in cost, and easily fitted with accessory parts to provide a filter insert for connection to cooperating parts of a filter tank.

The present invention offers such a cartridge and insert. The cartridge comprises a filter unit and a carrier or holder therefor, which holder with its carried unit is converted to a filter insert for a filter tank and connected by simple means for operation, then to be discarded when sufficiently clogged with debris as a result of long use.

The holder and the filter unit are constructed with cooperating parts. Each of the holder and the unit are variable in construction, as will appear hereinafter.

In a filter cartridge for the purposes mentioned, large filtering area and small filter-unit volume are important objectives, and these have been achieved in the present invention.

Briefly, the filter unit of itself is non-rigid and expansible, being an assembly of filter elements so constructed and joined that even substantially rigid filter material permits such expansibility and flexibility. But, in a filter cartridge, the elements are fixedly positioned relative to each other for operation by mounting the filter unit in the holder.

Essentially, each filter element comprises two filter leaves peripherally secured together at their edges so that liquid can pass through the leaves and be filtered by the leaves, to the space between the leaves, from which space filtered liquid is conducted away. Each element has a first leaf with an exit opening within its periphery, preferably at its center, for which opening means is provided to separate the opening from communication with the space exterior to the united leaves. The second leaf has means opposite said exit opening likewise to separate the space between the leaves from communication with the space exterior to the united leaves.

When there are more than two filter elements, the environmental structure for any intermediate element differs somewhat from the end elements of the plurality.

Each intermediate filter element has as said means at its exit opening, an adjacent filter element. The second leaf of the filter element adjacent a first leaf has an entrance opening in register with the exit opening of said first leaf, and the said adjacent first and second leaves of the two adjacent elements are peripherally secured together around and close to their registering openings. By this structure, a bellows-like assembly is formed which in its closely packed condition, tends to close the space between the two leaves of each element. By the flexing property of the leaves, whether substantially rigid or very flexible, the assembly may be stretched from such close packing, thus to separate the leaves of each element.

The end elements differ slightly. The exit opening of one end element is provided with means cooperative with accessory means providing a filter insert for connection in a tank, so that such accessory means separates the exit opening from communication with the space exterior to the filter unit.

The means at the other end element for preventing communication between the space between the leaves and the space exterior to the unit may vary. In one form where its second leaf has an opening like the second leaf of the intermediate elements, the means may be accessory closure means separate from the filter unit, for example, being associated with the tank which receives the cartridge. In another form wherein the second leaf of the end unit has no entrance opening opposite its exit opening, the leaf itself may be continuous within its periphery whereby the said means in question is an integral part of the second leaf.

The carrying holder for the filter unit which unit is an expansible assembly of filter elements, is preferably formed as a casing to carry the filter unit with its elements in fixed positions in expanded form. In the interest of economy, the expanded length of the unit is limited, but is preferably such as to assure space between leaves for conduct of liquid from the interior faces of the leaves of each element to the exit opening thereof. The expanded length must be sufficient to separate adjacent elements outwardly from the union for entry of liquid between them to be filtered, and to provide space for accumulated dirt and debris.

Preferably, substantially rigid spacing means is provided between the leaves of each filter element. Such means may have several functions which are independent. To explain these functions, an annular disk of cardboard is referred to which is one embodiment hereinafter described. Its substantially rigid character and its contour may function with flimsy or flexible filter leaves to hold the periphery of the joined leaves of an element in a substantially fixed line, preferably by including the periphery of the cardboard within the joined edges of the filter leaves. Incidentally, cardboard or other cellulosic material is useful when perchlorethylene is to be filtered, since such liquid does not destroy the desired rigidity.

Another function of such spacing means is exercised when the inner faces of the filter leaves is that of a loose fiber felt, to keep the two faces apart and thus to avoid a mild interlocking of fibers in the two faces where this would be disadvantageous. Some filter leaf material is capable of conducting liquid through it sheetwise. When the filter leaf material is not rigid, but flexible, as described, the spacing means provides rigidity to the filter element.

In another embodiment of the substantially rigid spacing means, channels for liquid are provided within the means, and such an embodiment is used especially when the filter leaf, which may be in facial contact with it, is a poor conductor of liquid sheetwise of its extent.

The choice of spacing means may also depend upon the construction or the intended position of the filter cartridge in use, whether horizontal or vertical.

Preferably, a low cost flexible loose fiber felt is used as the functioning part of the filter leaf. Because of its flexibility, it tends to sag in use, in one case when weighed with accumulated dirt, and also in part by external pressure of liquid in the tank, and in another case when pulled by an adjacent leaf. When the leaves are positioned in substantially horizontal extent, a flexible upper or second leaf in use, weighted or not by accumulated dirt and debris on its outer side, tends to sag. By the provision of substantially rigid spacing means, the sag is limited, and by the provision of channels for liquid in the upper face of the spacing means, the efficient filtering through said upper second leaf is assured in its horizontal position, when the leaf sags onto the spacing means.

A flexible first or lower leaf of a horizontal filter element likewise tends to sag in use when pulled by the adjacent filter element. Also, at its peripheral region such a flexible first leaf may be pushed upwardly by pressure of external liquid. Thus, when rigid spacing means is present, the leaf sags away from the spacing means at the exit opening and may be pushed into the spacing means near the periphery. These conditions make it advisable to have liquid channels in both faces of the spacing means. However, since the filter cartridge may be used vertically in commercial use in a tank to discharge either from its top or its bottom, it is preferred to provide rigid spacing means with channels for liquid in both faces. Accordingly, both leaves in a vertical position may contact the spacing means at a portion or at all of its area without obstructing drainage to the outlet opening.

Filter cartridges in various forms, such as those briefly referred to hereinabove, may be used in several ways, and may be designed for several such uses. In some installations, a perforated drainage pipe is inserted into the cartridge through the alined openings in the elements. Such pipe may be open to the exterior space of both ends of the filter unit or at only one end and when so open, be closed to prevent communication between its interior and the space exterior to the filter elements, with provision for connecting the pipe to the outlet conduit of the filter tank. Numerous mechanical means for such purposes may be used, but they form no essential part of the present invention as it is directed to the filter elements, the filter cartridge.

Likewise, the manner of uniting the adjacent filter elements to each other, and the manner of uniting the leaves of each element to each other may be varied without departing from the intended scope of the present invention. Exemplary constructions meeting the foregoing description and explanation of the invention are shown in the accompanying drawings, in which:

Figure 1:
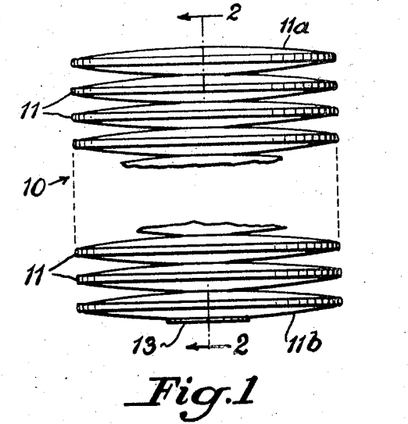
FIG. 1 represents the profile of a filter unit composed of a pile of circular filter elements.

FIG. 1 represents a filter unit or assembly 10 of filter elements 11 in a stretched-out condition, substantially as the unit is positioned in its carrier. The top element 11a is shown as having a leaf without an opening. The bottom element 11b is shown with an annular gasket or other means 13 attached to the exterior of its outlet for cooperation with means in a receiving tank to seal the outlet from the interior of the tank.

Figure 2:
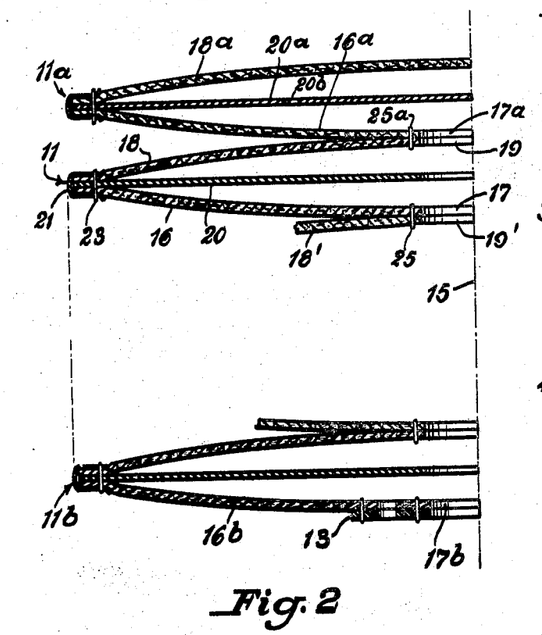
FIG. 2 is an enlarged fragmentary cross-section of portions of the unit shown in FIG. 1 taken on line 2—2 thereof, and showing only one-half of the structure at one side of the axis, and illustrating a filter unit of two leaves with internal spacing means.

FIG. 2 is an enlarged fragmentary cross-section on line 2—2 of FIG. 1, showing one-half of a filter unit at one side of center line 15. The component parts of the filter unit are shown schematically without designating the material or the structure of the components, which detail is elsewhere exemplified. The filter elements are designated as in FIG. 1, there being shown three slightly different forms 11, 11a and 11b. The intermediate filter elements 11 are typical. Element 11 has a first filter leaf 16 with an exit opening 17 at its center. Its second filter leaf 18 has an entrance opening 19 at its center. Between the two leaves 16 and 18 is spacing means, either loosely positioned or secured. Although the spacer 20, such as an annulus of stiff cardboard, may be free and unsecured within the filter element, it is preferred that the peripheral edges of the leaves 16 and 18 for the filter material shown in FIG. 3, and the spacer 20 be coincident and tightly secured together to close the unit. Although various methods of securing are available, the exemplary one has edge binding or tape 21 sewed at 23.

The means separating the outlet opening 17 from the space exterior to the filter elements 11 is the second leaf 18' (of which a fragment is shown) of the adjacent filter element, which leaf has an inlet opening 19' registering with outlet opening 17. The first leaf and said adjacent second leaf 18' are secured together about and close to their openings to separate their openings from communication with said exterior space. Numerous methods of joining the adjacent leaves are available. One method consists of peripherally sewing the leaves together close to the openings therein, as designated by numeral 25.

The means separating the inlet opening 19 of second leaf 18 of filter element 11 from communication with the exterior space is an adjacent element 11 illustrated by end element 11a. End element 11a has first leaf 16a with its outlet opening 17a secured in register with inlet opening 19 by stitching 25a, duplicating the union of leaves 16 and 18' by stitching 25.

End element 11a has spacing means 20a differing slightly from the intermediate elements 11. Its second leaf 18a likewise has means sealing its interior from communication with the exterior, and for lack of an adjacent element for such function, the said means is illustrated by a closure opposite its outlet opening 17a. The exemplary closure is an integral extension of the second leaf 18a, that is, leaf 18a is used without forming an opening therein. However, it is to be understood that the second or end leaf 18a may duplicate the leaf 18 and have an opening for which closure means may be supplied when installing the filter cartridge in a filter tank, as described below. Because of pressure acting on the exterior of end leaf 18a, a center hole is lacking in spacer 20a thus to prevent the pressure forcing the leaf 18a into the alined openings below it. Drainage holes 20b are provided in spacer 20a at locations away from the center.

Figure 3:
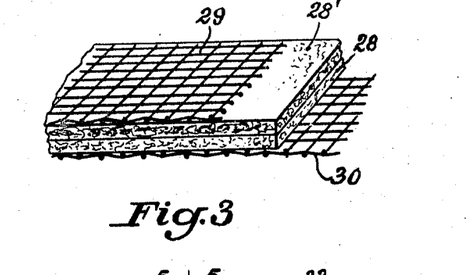
FIG. 3 is a perspective view showing the general structure of the material of the filter leaf.

The filter medium of the leaves of the filter element 11 may vary. In keeping with the objectives of economy and disposability, low-cost material is preferred. FIG. 3 represents suitable filter material which may be readily made in sheet form from which the leaves 16 and 18 are cut.

Numerals 28 and 28' represent adjacent layers of air-laid fiber felt of filtering quality, for example, a mixture by weight of 20 parts of sulfite wood fibers, 60 parts of long cotton fiber, and 20 parts of synthetic fibers, in particular, copolymer of vinyl chloride-vinyl acetate, for which a length of 1.5 inches and a denier of 3 is satisfactory, when the felt has a weight in the range from 25 to 50 lbs. per M sq. ft., and a thickness adjusted to the intended use. The fiber felt 28 has poor tensile strength in air-dry condition and is, therefore, carried by a stronger liner. However, its tensile strength is increased when wet with perchlorethylene. Each layer has an external facial liner, such as cotton scrim designated 29 and 30, bonded to the felt layers 28 and 28' by a starch binder.

Figure 4:
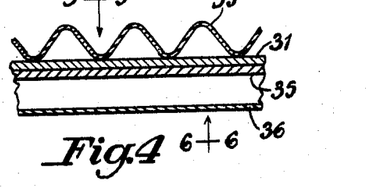
FIG. 4 is an enlarged fragmentary cross-section of a modified form of spacing means.

The spacing means 20 is preferably rigid and preferably provided with channels in each face to assure the flow of liquid from the entire interior of the elements 11 to the exit openings 17 thereof. Although in a vertically disposed filter cartridge, as illustrated in FIGS. 1 and 2 and having filter leaves which can flex and sag as described, it is preferred to have channels in both faces of the spacer 20. This may be accomplished in one way by providing spacing means in two identical parts placed back to back, each having a planar back and a channeled face. Single-faced corrugated paperboard provides such parts. FIG. 4 is an enlarged cross-section of the two back-to-back disks of such corrugated board showing the preferred relationship thereof as spacing means. The upper part in FIG. 4 has facing sheet 31 to which is secured corrugated sheet 33. The lower part has facing sheet 35 to which is secured corrugated sheet 36. The corrugations of the two parts are angular to each other for reasons which will become apparent from the descriptions of FIGS. 5 and 6.

Figure 5:
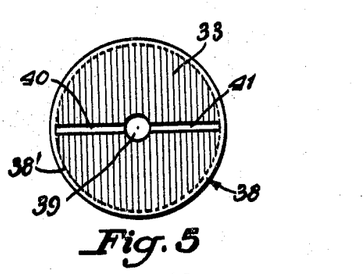
FIG. 5 is an ensmalled plan view of the entire spacing means of FIG. 4 looking in the direction of the arrow 5—5 in FIG. 4.

The corrugations within the area of the filter elements are made to communicate within the facial boundaries of each piece of corrugated board, with an opening therein which registers with the openings 17 and 19 in the filter leaves. FIG. 5 is a view looking down along the arrow 5—5 of FIG. 4, on a spacer, such as is designated 20 in FIG. 2. The upper part 31–33 of FIG. 4 designated as disk 38 in FIG. 5 has opening or aperture 39 and two alined radial slots 40 and 41 crossing the corrugations. Slots 40 and 41 are openings through the two sheets 31 and 33. The outer ends of the slots extend substantially to the regions of the disk 38 which are included within the peripheral union of the leaves, such as the binding 21 (FIG. 2), at which regions the corrugated sheet is flattened as indicated by the dotted areas 38'.

Figure 6:
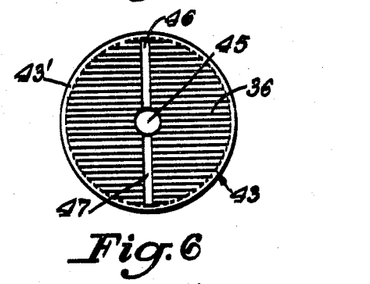
FIG. 6 is an ensmalled plan view of the entire spacing means of FIG. 4 looking in the direction of the arrow 6—6 in FIG. 4.

The part 43 of FIG. 6 represents the view looking up along arrow 6—6 of FIG. 4, and is oriented with respect to the part 38 of FIG. 5 to indicate that the corrugations are at right-angles to each other. Part 43 has central opening 45, slot openings 46 and 47, and flattened periphery 43'. By positioning the two corrugated parts 38 and 43 back-to-back, secured or not, the facing sheet 35 of part 43 forms a channel bottom for the openings 40 and 41 in part 38, and the facing sheet 31 of part 38 forms a channel bottom for the openings 46 and 47 of part 43.

Figures 5A, 6A:
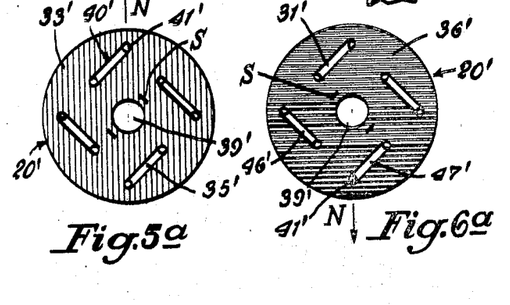
FIGS. 5a and 6a are views similar to FIGS. 5 and 6 of a modified form of spacer.

FIGS. 5a and 6a show a modified form of corrugated spacer. FIG. 5a looks down on a laminate of the same structure as shown in FIG. 4, and FIG. 6a looks up at the same structure, the arrow N indicating "north" to correlate the views.

The modified spacer 20' consists of two annular disks of single-faced corrugated paperboard secured together as by staples S. As shown the spacer is of size to fit unsecured within a filter element with its periphery close to the periphery of the unit. FIG. 5a has corrugated sheet 33' united to facing sheet 31' which shows in the slots of FIG. 6a. Each corrugated layer has slots through it, so that in the facing-to-facing assembly of two such layers, the slots become channels of which the facing sheet of one layer is the bottom of the channel opening in the other layer. FIG. 6a shows corrugated sheet 36' with its corrugations at right angles to the corrugations of FIG. 5a. Sheet 36' is secured to facing sheet 35' which shows in the slots of FIG. 5a. Each disk is similarly slotted with four slots, each at 45° to the corrugations. The channels are centrosymmetrical in each face and consists of a first set even in number and a second set even in number. The slots or channels of the first set, exemplified by channel 31' and 47' of FIG. 6a, cross a portion of the corrugations remote from the aperture 39' which by-pass the aperture. The channels of the second set, exemplified by channels 46' in FIG. 6a and 40' in FIG. 5a, cross substantially all of the remaining corrugations which are closer to the aperture 39' and which by-pass the aperture, and also cross corrugations which communicate directly with the aperture. Each channel of each set overlies and communicates with a channel of each of the two sets, by reason of openings in the channel bottom, such as opening 41' in FIG. 5a. These openings result from the overlapping of the slots in the two layers. This result is achieved by having the outer ends of each slot cross a diameter by a small amount, which amount predetermines the size of the said openings. Only one of the eight openings through the spacer is designated, namely, the opening 41' in the slot designated 40'. Thus, substantially all the channels in each corrugated face of the spacer 20' which do not lead to the central opening 39', cross a slot in the same face. Liquid can flow into such slots, through one of the end openings 41' of the slot, into a connecting slot in the opposite disk, and therefrom along its corrugations to the central opening 39'.

The filter unit as illustrated in FIG. 2 is expansible and resilient axially and is flexible, requiring rigidifying support. A carrying holder is provided to fix the length of the unit axially and to fix the position of each filter element relative to its adjacent filter elements. Thus, a filter cartridge is provided.

Figure 7:
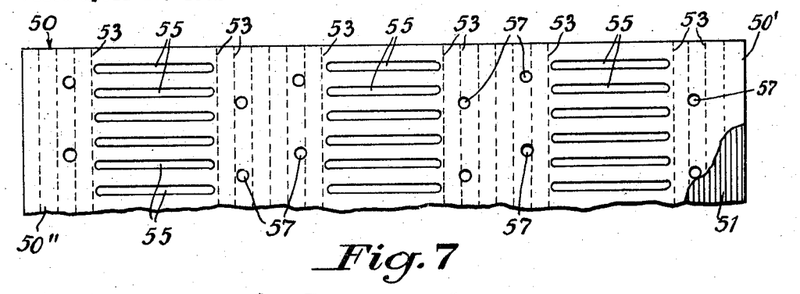
FIG. 7 is a fragmentary view of suitably rigid sheet material used to form a holding case for the filter unit.
Figure 8:
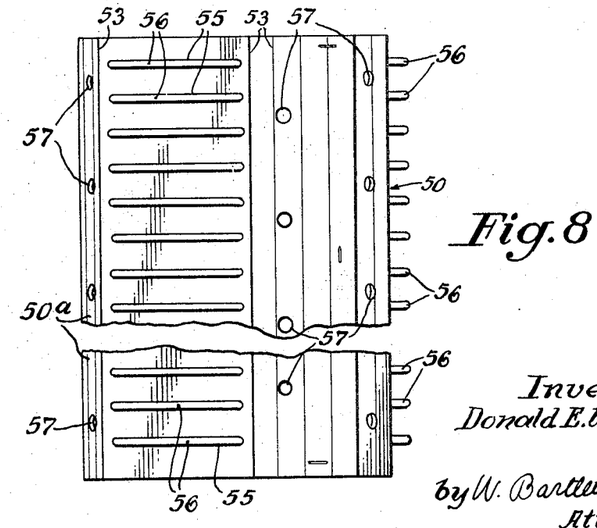
FIG. 8 is a view of a filter cartridge having the filter unit mounted in the holding case.
Figure 9:
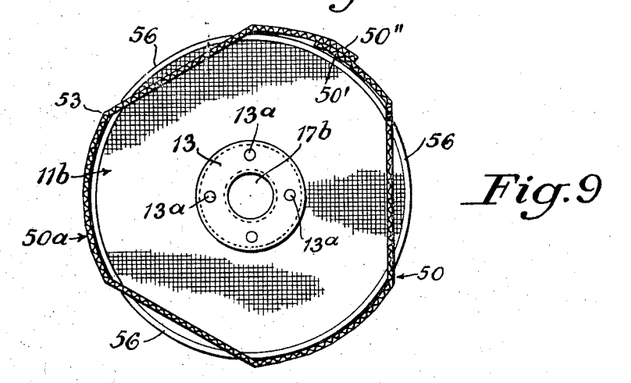
FIG. 9 is a plan view of the bottom of the filter cartridge of FIG. 8.

FIG. 7 represents a precut sheet 50, such as double-faced corrugated paperboard, with corrugations 51 extending in the direction shown to give resistance to compression and to facilitate bending the sheet on dotted crease lines 53, in forming a generally circular housing or holder for the filter unit, as shown in FIGS. 8 and 9. In FIG. 9, the panels having score-lines 53 are shown more arcuate than in reality for drafting convenience. Elongated openings 55 in sheet 50 are formed, there being shown three alined openings for each of the filter elements 11. FIGS. 8 and 9 show edge portions 56 of the filter elements projecting from the openings 55 when the sheet 50 is wrapped around the filter unit of FIG. 2 with its side edge portions 50' and 50" overlapping and stapled together. To provide for easy access of liquid to the interior of the resulting holder 50a (FIGS. 8 and 9), holes 57 are also formed in sheet 50.

FIG. 9 is a view looking up at the bottom of the cartridge as shown in FIG. 8, showing the end element 11b, its outlet opening 17b, and the gasket 13 around opening 17b for connection with outlet means of a filter tank for which holes 13a may be provided for use as described below.

Figures 10, 11, 12:
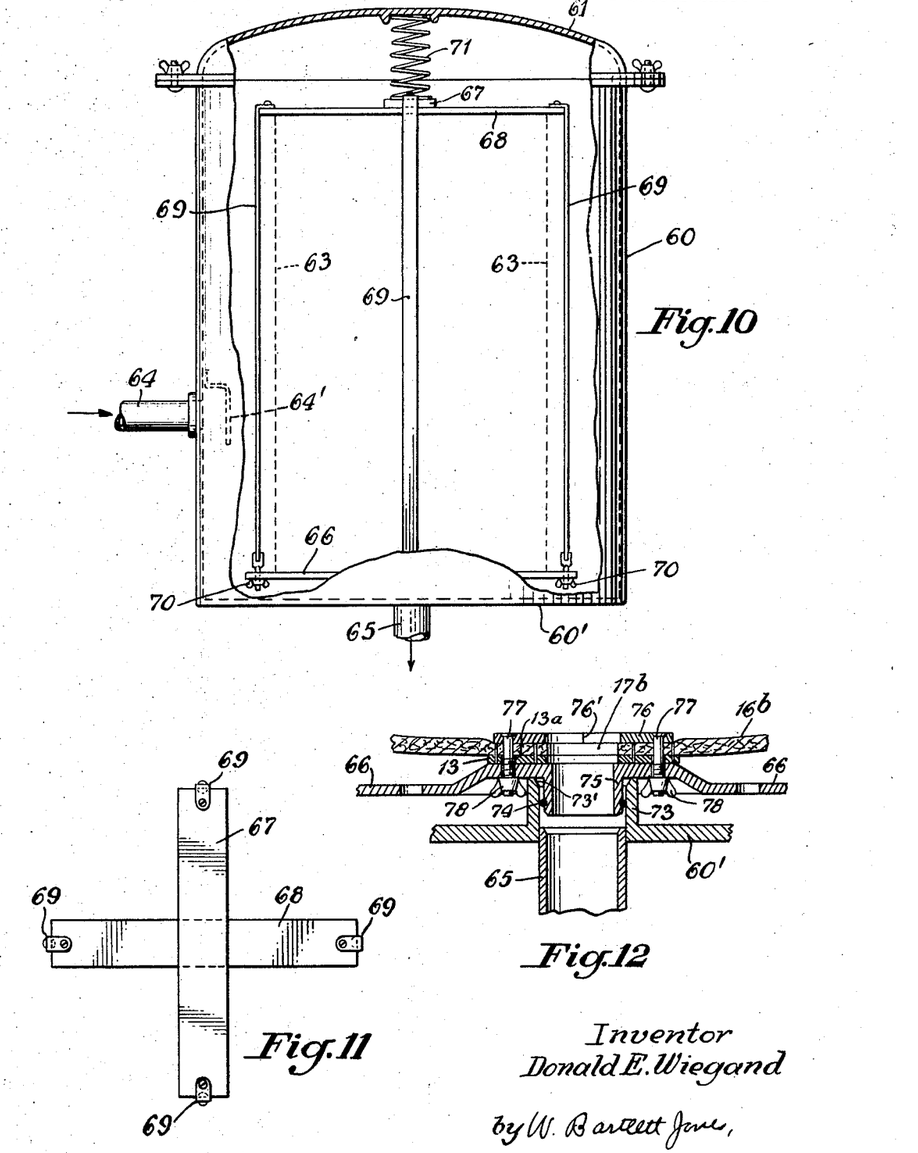
FIG. 10 is a fragmentary view showing in part diagrammatically the filter cartridge of FIG. 8 mounted in a filter tank in which no center tube is employed.
FIG. 11 is a plan view of a portion of mounting structure used at the top of the cartridge in FIG. 10.
FIG. 12 is an enlarged detailed cross-section of the connections between the filter cartridge and the exit conduit from the tank of FIG. 10.

FIG. 10 illustrates a filter tank 60 with removable cover 61 which when removed permits entry and removal of a filter insert comprising a disposable cartridge represented by dotted lines 63. An inlet pipe 64 is provided for liquid to be filtered, discharging toward baffle plate 64'. Outlet pipe 65 is provided for filtered liquid.

The filter cartridge 63 is like the one shown in FIGS.

1 and 2 having no opening in the top leaf. The buoyancy of the cartridge in the tank is overcome by accessory means which also effect a tight fit of the bottom of the insert with outflow connections at the bottom of the tank. As shown in FIG. 10, the cartridge 63 is clamped endwise between a bottom plate 66 and a cross-arm unit (FIG. 11) having arms 67 and 68 over the top of the cartridge. The cross-arms and the plate extend beyond the cartridge and are tied together by steel straps 69 extending from the ends of arms 67 and 68 to the plate 66 where they are connected and tightened by wing nuts 70. The plate 66 is supported by suitable means exemplified in FIG. 12. A spring 71 located between cover 61 and cross-arm 67 urges the cartridge down in FIG. 10 when the cover is secured in place.

In FIG. 12, the bottom 60' of the tank 60 has an upwardly extending annular boss 73 opening into the outlet pipe 65. Boss 73 has a tapered entrance 73' through which is inserted an annular nose 75 attached to the cartridge and to said plate 66. Plate 66 rests on the top of boss 73. Nose 75 is suitably shaped so that it may carry an O-ring 74 to effect a tight seal. As described above, the gasket 13 is secured around the opening 17b in lower leaf 16b. A metal ring or plate 76 of two semicircular parts designated by the driving line 76' is easily inserted and positioned within the opening 17b to clamp lower leaf 16b between ring 76 and plate 66. Ring 76 carries threaded studs 77 passing through holes 13a in the leaf 16b in gasket 13 and in plate 66, for receipt of tightening wing nuts 78. By this structure, spring 71 pushes nose 75 into receiving socket 73.

The structure of a cartridge and its instruction in a filtering tank are not limited to those shown in FIGS. 10, 11 and 12. There is another method in which a removable perforated tubular post is made a part of the insert, but reused when replacing a cartridge. The same tank as shown in FIG. 10 may be used.

Figure 13:
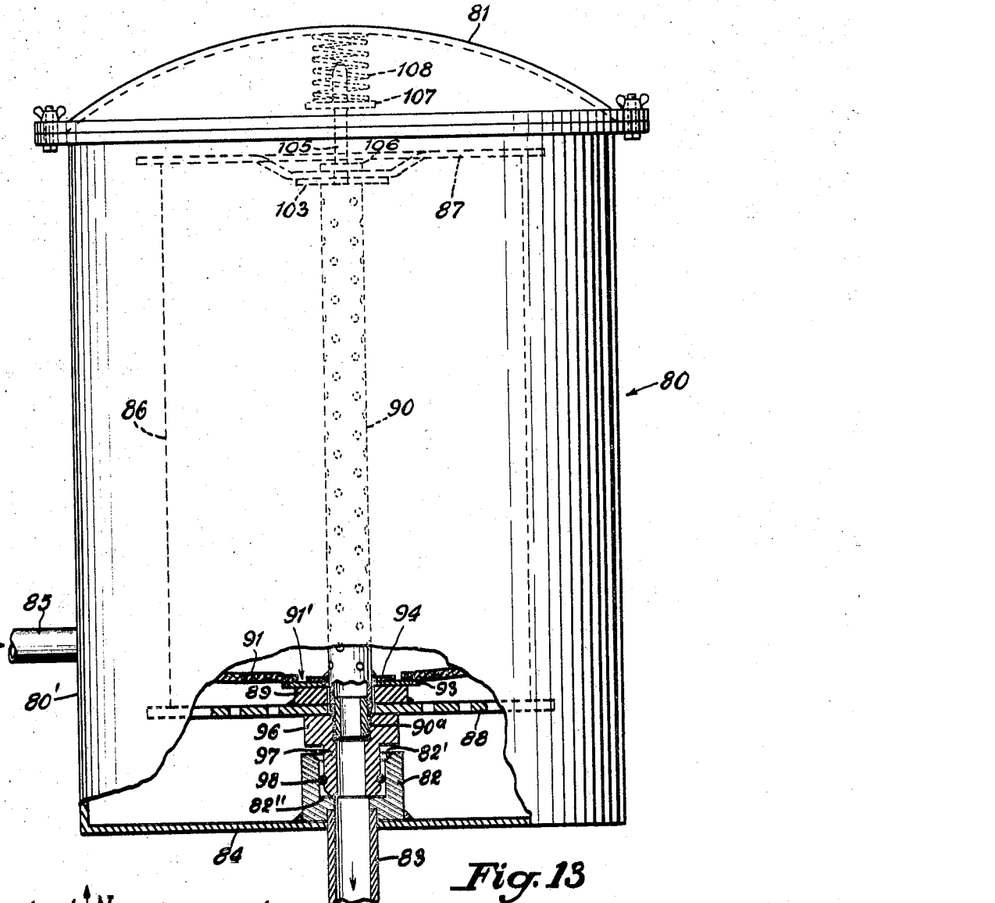
FIG. 13 is a combined view similar to FIGS. 10 and 12 showing modified forms thereof including the presence of a perforated pipe within and projecting from the filter cartridge.

In FIG. 13, tank 80 with removable cover 81 has an open top through which an insert is installed for connection with upwardly opening annular boss 82 with a tapered entrance opening 82' which boss is located over outlet pipe 83 in tank bottom 84. Boss 82 has an internal annular shoulder 82". Inlet pipe 85 is set in the tank side wall 80'.

Dotted lines 86 represent a cartridge of which a portion only in cross-section is shown for said connection at the bottom of the tank. The cartridge is shown as housed between an upper perforated plate 87 and a lower perforated plate 88, the upper plate being optional as appears hereinafter. Plate 88 carries a collar 89 on its upper side through the opening of which extends a perforated pipe 90 for conducting filtered liquid from the filter elements. The end of pipe 90 has welded to its interior at its bottom end an externally threaded extension 90a which extends beyond the plate 88. The bottom filter leaf 91 has secured to it an annular fiber gasket 93 with opening of less diameter than the opening 91' in the lower leaf 91. Pipe 90 has secured to it, as by welding, an originally annular flange 94 to be positioned within the opening 91' in the gasket 93 and over the gasket 93 to clamp it against collar 89. A separate annular nut-structure has a threaded nut-end 96 and an integral discharge nose 97 adapted to enter the boss 82 the and rest on annular shoulder 82" and to be sealed by an O-ring 98 carried by the nose 97. Nut 96 is threaded onto the pipe extension 90a to clamp between nut 96 and pipe-flange 94, the gasket 93, collar 89 and plate 88, and any projecting edge portions of the leaf 91.

Figure 15:
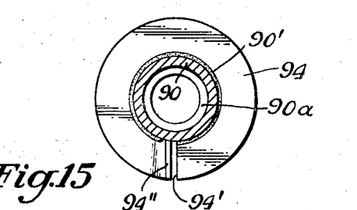
FIG. 15 is a cross-section on line 15—15 of FIG. 14.
Figure 16:
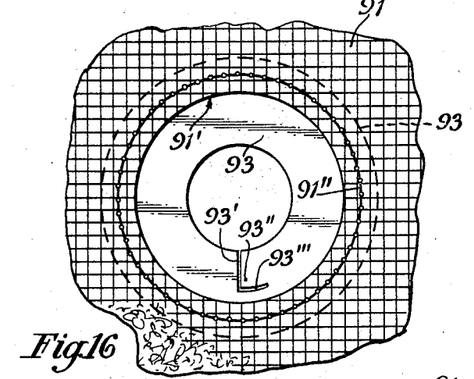
FIG. 16 is a fragmentary plan view of the inside of the lowermost leaf of the filter shown in FIG. 13 showing a gasket cooperative with the flange on the pipe for clamping the gasket in part by said flange.

Since pipe-flange 94 is larger in diameter than the opening in gasket 93 through which opening the flange must pass, both of the flange 94 and gasket 93 are made to function as single-thread structures so as to thread flange 94 through the opening. The structures for these parts are shown in FIGS. 14, 15 and 16, which are aligned.

Figure 14:
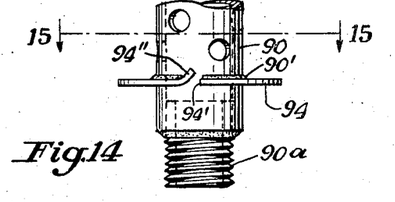
FIG. 14 is an enlarged view of the end of the pipe shown in FIG. 13 illustrating a clamping flange thereon.

FIG. 14 shows the flange 94 welded at 90' to pipe 90 around 360°. FIG. 15 shows a substantially radial cut 94' from the periphery of flange 94 forming a split-ring to provide a threading tab 94", shown in FIG. 14 as bent inwardly as in the position to be used as described below. Tab 94" is the end of an external thread which is the outer edge of the flange 94. Tab 94" in its raised position is welded to the pipe. FIG. 16 shows the lower leaf 91 as viewed from inside the filter element with annular gasket 93 secured to it by a line of stitching 91". The gasket 93 has a radial cut 93' and a small concentric cut 93'" therein forming a threading-tab 93" for bending to provide a passageway through the gasket 93. The opening in the gasket 93 has a radius at least equal to or slightly greater than the radius of the pipe 90; and the diameter of the opening 91' in the leaf 91 is preferably larger than the diameter of the flange 94 to avoid clamping edge portions of leaf 91. The radius for arcuate cut 93'" may be equal to and preferably somewhat greater than the radius of flange 94. By this construction, the flange 94 can be placed at the underside (in FIG. 13) of the gasket 93 with the end of flange-tab 94" opposing the end of gasket-tab 93", bent from its normal plane to provide an entrance or passageway through the gasket for tab 94" and the trailing portion of flange 94. Then, while turning the two relatively and entering the flange-tab 94" over (in FIG. 13) the gasket-tab 93", rotating through 360° or more brings the flange 94 to the upper side (in FIG. 13) of the gasket 93.

Figure 17:
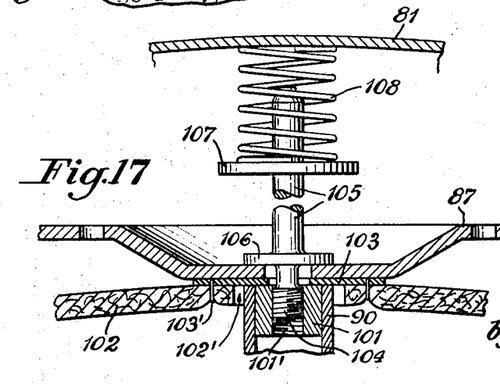
FIG. 17 is an enlarged fragmentary cross-sectional detail of the mounting of the filter cartridge at the top of the tank of FIG. 13.

To retain the cartridge 86 in the socket 82, structure such as detailed in FIG. 17 may be used. Pipe 90 has a nut-plug 101 secured flush in its end, which pipe end is about flush with the top of the cartridge 86. The upper leaf 102 of the upper filter element has an opening 102' over which is an annular gasket 103, which may be chipboard or vegetable fiber gasket material secured as by sewing 103' to the leaf 102. The gasket 103 has an opening of smaller diameter than leaf opening 102', and smaller than the diameter of nut-plug 101, but not smaller than the threaded opening 101' therein. Plate 87 has an opening over the threaded opening of the nut-plug 101 to admit the threaded end 104 of a stem 105, which stem carries an annular flange 106 to overlie plate 87 and to clamp the latter and the gasket 103 to the tops of the pipe 90 and its nut-plug 104. Stem 105 carries a manual handle 107 intermediate its ends for threading the stem into plate and for lifting the insert out of the tank. The handle 107 is arranged to receive the end of a spring 108 which is compressed between the handle 107 and the affixed cover 81, the spring being preferably welded or otherwise secured to the cover 81. The terminal end of stem 105 guides the spring into place in assembling.

In the form of the filter elements described above, adjacent elements have their adjacent leaves connected at regions close to peripheries of their registering openings, and in use the adjacent leaves of adjacent elements are spaced apart outwardly from said regions. Where the adjacent leaves of adjacent elements are joined together in contact as shown, the two leaves of each element are pulled apart in forming the unit, thus forming in the no-sag condition of each leaf, not only filtering space between adjacent elements, but also a space between the leaves of each element which narrows toward the periphery of the element. With filter leaves which do not sag, spacing means between the leaves may be dispensed with when each element is so expanded assuming of course that the outer periphery of each element is adequately stabilized in position. The said space which narrows outwardly within the element may be dispensed with by providing leaves which are all parallel in the filter unit and by providing spacers between the adjacent elements.

Figure 18:
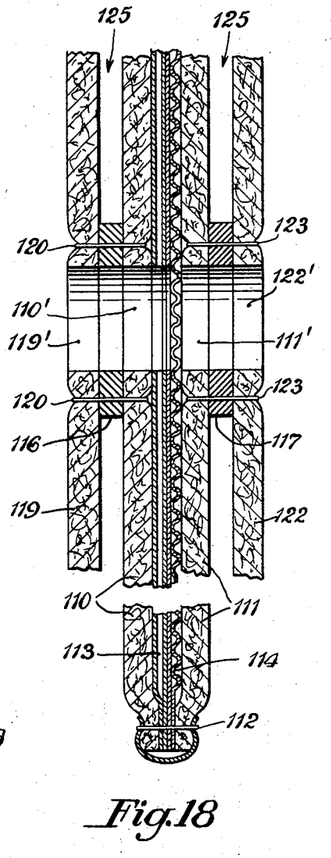
FIG. 18 is an enlarged fragmentary view of a modified form of filter construction for mounting on a horizontal axis.

FIG. 18 shows a modified form, in which the position of the leaves is represented as vertical, thus to avoid gravitational force to induce sagging when the leaf is such as to sag. In FIG. 18, one element is indicated in a broken view with a portion of the adjacent elements attached to it. Numerals 110 and 111 indicate filter leaves which may be flexible and capable of sagging or more rigid and incapable of sagging. These are secured together at their peripheries by means 112, such as stitches or staples, with spacing means included. The spacing means is shown as the back-to-back corrugated paperboard pieces 113 and 114, as above described, the peripheries of which are flattened where the leaves are joined.

The leaf 110 has a central opening 110' in register with a like opening in an annular spacing ring 116. The leaf 111 likewise has a central opening 111' in register with the opening of an annular spacing ring 117. Filter element adjacent the leaf 110 is represented by one leaf 119 with its central opening 119' in register with the opening of spacer ring 116. The numeral 120 represents means, such as stitching securing together the leaves 110 and 119, and their spacer ring 116.

On the opposite side the adjacent element is represented by one leaf 122 with its opening 122' in register with the opening of the annular spacer ring 117. Peripheral securing means 123, such as stitching, secures the ring 117 between leaves 111 and 122.

As a result, the interior faces of the leaves of each element are in facial contact with the draining spacing means 113–114, with no waste space within an element. Also, the spaces 125 between elements is narrow, but open for entry of liquid and accumulation of debris. As a result of the horizontal axis of the filter unit as shown in FIG. 18, such accumulation may drop away from the original place of deposition. In addition, the pressure of liquid externally of the filter elements does not move the leaves thereof because they are normally positioned in contact with the channel-containing spacing means.

Numerous variations of structure are contemplated for the filter leaf, the filter element, the filter unit, the filter cartridge, and by providing accessory means for the filter insert. In use a spent cartridge is removed from a tank as an insert, its accessory parts removed and attached to a fresh cartridge, thus forming a new insert for a tank.

From the foregoing it will be appreciated that the invention is not limited to or by the illustrative embodiments thereof, and that other forms are contemplated as falling within the scope of the appended claims.

I claim:
1. In a filter having a filter element comprising two filter leaves secured together at their peripheries of which leaves at least one is provided at its interior with an outlet opening for discharging from the interior of the element liquid filtered thereinto through said leaves, the improvement which comprises spacing means between said two leaves, said spacing means having an interior aperture in register with said outlet opening, said spacing means consisting of two layers of single-faced corrugated paperboard with their corrugations substantially at right angles to each other, each layer comprising a corrugated sheet secured to a facing sheet, the two facing sheets being in facial contact, each layer having corrugations which communicate with said aperture and corrugations which by-pass said aperture, each layer having a plurality of channels crossing substantially all of the corrugations which by-pass said aperture, the channels of each layer extending through the facing sheet of said layer, the bottoms of the channels of each layer being the facing sheet of the other layer, said crossing channels having direct communication with said aperture.

2. In a filter having a filter element comprising two filter leaves secured together at their peripheries of which leaves at least one is provided at its interior with an outlet opening for discharging from the interior of the element liquid filtered thereinto through said leaves, the improvement which comprises spacing means between said two leaves, said spacing means having an interior aperture in register with said outlet opening, which spacing means consists of two layers of single-faced corrugated paperboard with their corrugations angular to each other, each layer comprising a corrugated sheet secured to a facing sheet, the two facing sheets being in facial contact, each layer having in its face channels crossing substantially all of the corrugations, said channels including a first set of channels even in number crossing some of the corrugations remote from the aperture which by-pass said aperture and a second set of channels even in number crossing substantially all of the remaining corrugations closer to the aperture which by-pass said aperture and crossing corrugations which communicate directly with said aperture, the bottoms of said channels in each layer being the facing sheet of the other layer, the bottom of each channel in each layer having a first opening therethrough communicating with a channel of the first set in the other layer and a second opening therethrough communicating with a channel of the second set in the other layer.

3. In a filter having a filter element comprising two filter leaves secured at their peripheries of which leaves at least one is provided at its interior with an outlet opening for discharging from the interior of the element liquid filtered thereinto through said leaves, the improvement which comprises spacing means between said two leaves, said spacing means having an interior aperture in register with said outlet opening, said spacing means consisting of two layers of single-faced corrugated paperboard with their corrugations at an angle to each other, each layer comprising a corrugated sheet secured to a facing sheet, the two facing sheets being in facial contact, each layer having corrugations which communicate with said aperture and corrugations which by-pass said aperture, each layer having a plurality of channels crossing substantially all of the corrugations which by-pass said aperture, each of the channels of each layer extending through the facing sheet of said layer, the bottoms of the channels of each layer being the facing sheet of the other layer, said crossing channels having communication with said aperture.

References Cited by the Examiner

UNITED STATES PATENTS

| 2,014,105 | 9/1935 | Dooley | 210—493 |
| 2,088,199 | 7/1937 | Gleason | 210—347 |
| 2,235,624 | 3/1941 | Schwartz | 210—486 X |
| 2,301,803 | 11/1942 | Davis | 210—167 |
| 2,372,865 | 4/1945 | Taylor | 210—493 |
| 2,392,354 | 1/1946 | Alsop | 210—347 |
| 2,720,983 | 10/1955 | Kracklauer | 210—347 |

FOREIGN PATENTS 905,969  3/1954  Germany.

REUBEN FRIEDMAN, *Primary Examiner.*

HERBERT L. MARTIN, *Examiner.*

UNITED STATES PATENT OFFICE
CERTIFICATE OF CORRECTION

Patent No. 3,231,094                 January 25, 1966

Donald E. Wiegand

It is hereby certified that error appears in the above numbered patent requiring correction and that the said Letters Patent should read as corrected below.

Column 3, line 29, after "elements," insert -- the filter unit and --; column 4, line 46, after "leaf" insert -- 16 --; column 7, line 25, for "driving" read -- dividing --; line 32, for "instruction" read -- installation --; line 63, strike out "the", second occurrence; column 8, line 46, for "plate" read -- place --; column 10, line 31, after "secured" insert -- together --.

Signed and sealed this 17th day of January 1967.

(SEAL)
Attest:

ERNEST W. SWIDER
Attesting Officer

EDWARD J. BRENNER
Commissioner of Patents